US007506033B2

United States Patent
Case et al.

(10) Patent No.: US 7,506,033 B2
(45) Date of Patent: Mar. 17, 2009

(54) SYSTEM AND METHOD FOR REMOTELY ACCESSING A CLIENT IN A CLIENT SERVER ENVIRONMENT

(75) Inventors: Douglas Robert Case, San Jose, CA (US); David Derk, Morgan Hill, CA (US); James Michael Dile, San Jose, CA (US); Robert Clair Edwards, Jr., Susquehanna, PA (US); Avishai Haim Hochberg, San Jose, CA (US); David T. Kwan, Los Gatos, CA (US); Thomas Franklin Ramke, Jr., Vonore, TN (US); Pete Tanenhaus, San Jose, CA (US); Randy Tung, San Jose, CA (US); John Viksne, San Mateo, CA (US); Brett Walker, San Jose, CA (US); Hui-Lan Wen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1238 days.

(21) Appl. No.: 09/191,256

(22) Filed: Nov. 12, 1998

(65) Prior Publication Data

US 2002/0107907 A1    Aug. 8, 2002

(51) Int. Cl.
*G06F 15/16* (2006.01)
*G06F 3/00* (2006.01)
(52) U.S. Cl. .................... 709/217; 709/203
(58) Field of Classification Search ............ 709/203, 709/202, 217, 219, 220, 225, 250
See application file for complete search history.

(56) References Cited

U.S. PATENT DOCUMENTS

| 5,258,855 | A |   | 11/1993 | Lech et al. .......... 358/462 |
| 5,369,508 | A |   | 11/1994 | Lech et al. .......... 358/462 |
| 5,542,078 | A |   | 7/1996 | Martel et al. ........ 395/600 |
| 5,682,524 | A |   | 10/1997 | Freund et al. ....... 395/605 |
| 5,737,736 | A |   | 4/1998 | Chang ............... 707/102 |
| 5,768,416 | A |   | 6/1998 | Lech et al. .......... 382/180 |
| 5,881,232 | A | * | 3/1999 | Cheng et al. ........ 709/217 |
| 5,926,624 | A | * | 7/1999 | Katz et al. .......... 709/217 |
| 5,941,954 | A | * | 8/1999 | Kalajan ............. 709/239 |
| 5,944,791 | A | * | 8/1999 | Scherpbier ......... 709/218 |

(Continued)

OTHER PUBLICATIONS

ADSM Concepts, pp. 1-351, Feb. 1997.*

*Primary Examiner*—Larry D Donaghue
(74) *Attorney, Agent, or Firm*—Kunzler & McKenzie

(57) ABSTRACT

The present invention provides a system and method for remotely accessing a client in a client-server system. From a browser, an end user enters a URL containing a machine name and a port number. A listening program at the client listening on that port number establishes communication with the browser and invokes a client agent. The client agent includes conventional client functions as well as APIs that allow the client to interface with both the server and the browser. The client agent then serves an applet to the browser that makes the browser appear to the end user as the client machine. The user can then execute client functions from the browser. Examples of the client functions include backing up and restoring files from the client to/from the server, migrating or recalling files, archiving or retrieving files.

13 Claims, 12 Drawing Sheets

U.S. PATENT DOCUMENTS

| | | | |
|---|---|---|---|
| 5,948,066 A * | 9/1999 | Whalen et al. | 709/229 |
| 5,974,444 A * | 10/1999 | Konrad | 709/203 |
| 6,012,090 A * | 1/2000 | Chung et al. | 709/219 |
| 6,075,776 A * | 6/2000 | Tanimoto et al. | 370/254 |
| 6,085,242 A * | 7/2000 | Chandra | 709/223 |
| 6,115,741 A * | 9/2000 | Domenikos et al. | 709/217 |
| 6,119,247 A * | 9/2000 | House et al. | 714/38 |
| 6,381,650 B1 * | 4/2002 | Peacock | 709/245 |
| 6,847,987 B2 * | 1/2005 | Case et al. | 709/203 |

* cited by examiner

```
Transaction
    diBeginTxn

Protocol
        diBeginTxnVerb                    Applet --------> Agent

Verb(s)
        typedef struct
        {
            ExtVerbHdr   h;               /* extended verb header        */
            nfTwo        verbVersion;     /* version of this verb        */
            nfFour       reserved1;       /* reserved for future use     */
            nfFour       reserved2;       /* reserved for future use     */
            nfFour       reserved3;       /* reserved for future use     */
            nfFour       reserved4;       /* reserved for future use     */
        } diBeginTxnVerb;

diEndTxn

Protocol
        diEndTxnVerb                      Applet <--------------- Agent
```

Fig. 6

SYSTEM AND METHOD FOR REMOTELY ACCESSING A CLIENT IN A CLIENT SERVER ENVIRONMENT

BACKGROUND OF THE INVENTION

1. Field of the Invention

The present invention relates generally to client-server software, and more particularly to a method and system for accessing a client from remote locations.

2. Description of Related Art

Conventional client-server software allows conventional clients residing on a client machine to access functions provided by a server residing on a server machine. For example, some conventional client-server software provides backup and restore of data residing on client machines. In order to backup data, software residing on a client machine or a user utilizing the client machine invokes the conventional client. This may be through an application programming interface (API), a command line or a graphical user interface (GUI). The conventional client then requests the conventional server to backup the data and passes the data to the conventional server. The conventional server stores the data and provides a response to the conventional client that the data has been successfully stored. When the data is to be restored, the conventional client sends a request for the data to the conventional server. In response, the conventional server provides a copy of the stored data to the conventional client.

It is desirable for client-server software to work with many different client platforms or server platforms. A client platform can be viewed as a particular type of client machine or operating system. Similarly, a server platform can be viewed as a particular type of server machine. Compatibility with different platforms may be especially desirable for client platforms. This is because there is a large number of operating system platforms that users wish to have their clients on. A network may have many client machines using many different client platforms. All of these platforms are often used with the same server. Consequently, the client-server software should be compatible with multiple desired client platforms. In order for the client-server software to function with different client platforms, the conventional client can be ported or installed on the client platform. Once installed on the client platform, the end user, by logging into the client, can access the functions of the server.

Although it is advantageous for a client to be compatible and installed across a wide variety of client platforms, this approach also has its drawbacks. One such problem is encountered when there is a need to access client machines remotely. This problem is compounded when there is a need to access multiple client machines remotely. Since a user needs to login to the client machine to initiate a client access to a server, this requires the user to be either physically or remotely logged into the client to invoke the services provided by the server. Remotely logging into the client further requires operating system specific application software at the remote location to obtain access. Thus, a system administrator working at a server cannot easily access all the client machines in a network. For example, in the context of storage management in a client-server environment, one main problem is not being able to manage storage from anywhere. To initiate the client operation on a client-server software product generally requires login access to that client machine. "Remote" client access in the prior art technologies required a remotely logging into the client as mentioned above. Thus, it is difficult from a remote location to request a workstation be backed up to the server, and similarly for a file to be restored from the server to the workstation.

Accordingly, it can be seen that there is a need to provide a client for a client-server system that can be accessed from anywhere. It would be desirable to provide a client that could be accessed locally, remotely, or even from the server itself. Further, it would be desirable to provide a storage management system wherein client data could be backed up or restored from remote locations.

SUMMARY OF THE INVENTION

To overcome the shortcomings of the prior art described above, it is the object of the present invention to provide a client for a client-server system that can be remotely accessed from any location.

It is another object of the present invention to provide a method for a storage management client to operate remotely via a browser.

Still another object of the present invention is to provide a method for invoking a client remotely that requires no special software other than a web browser.

Yet another object of the present invention is to provide a storage management system wherein the storage can be managed from any location, at the server, at the client or remotely.

Briefly stated, the present invention provides a system and method for remotely accessing a client from numerous machines and different platforms that requires no special software. This distributed client facility accomplishes a remote invocation of the client operations through a web browser such as Netscape Navigator or Microsoft Internet Explorer. The system and method of the present invention includes defining a set of application programming interfaces (APIs) or verbs that may be called remotely or from the same machine that the client portion of the client-server software is running on. The client user interface code then uses these new APIs to remotely invoke the client operations. These APIs provide the ability to have one to one communication or two way communication, for example sending a query and getting a reply. Further, there may be one to multiple relationship between a query request being sent and the number or replies. Similarly, there may be a multiple to one relationship between the number of queries and the number of replies.

From a browser, an end user enters a URL containing a machine name and a port number separated by a colon. A listening program at the client listening on that port number establishes communication with the browser and invokes a client agent. The client agent include conventional client functions as well as APIs that allow the client to interface with both the server and the browser. The client agent then serves an applet to the browser that makes the browser appear to the end user as the client machine. The applet can execute in the national language of either the client or the browser. The user can then execute client functions from the browser such as requesting the client to back itself up to the server.

The present invention also provides a distributed storage management client facility wherein the storage can be managed in a robust and distributed fashion. A distributed storage management client in a client-server system can be accessed remotely through a web browser such as Netscape Navigator or Microsoft Internet Explorer. For example, a user at home can access a client machine at the office and subsequently backup the client to a server (or restore a file from a server to the client machine in the office). The user can also migrate and recall, archive and retrieve files to the client from the server. Similarly, a system administrator at a central location can access a client machine and initiate these client functions to the server.

An advantage of the present invention is that it provides an improved method for accessing a client in a client-server software system.

Another advantage of the present invention is that in a distributed storage management system it reduces the manual effort involved for a system administrator to access client machines.

Another advantage of the present invention is that it reduces the effort required for the user to invoke and perform client operations.

Still another advantage of the present invention is that it requires no special software to access a multiple clients from a single location (as in the case of a system administrator) or to access the client from multiple platforms (as in the case of an end user).

Still another advantage of the present invention is the ability to have the same look and feel to the client across multiple platforms.

The above, as well as additional objects, features and advantages of the present invention will become apparent in the following detailed written description.

BRIEF DESCRIPTION OF THE DRAWINGS

FIG. 6 is an example of the structure for an API verb to begin a transaction after remotely accessing a client machine;

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

Figure 1:
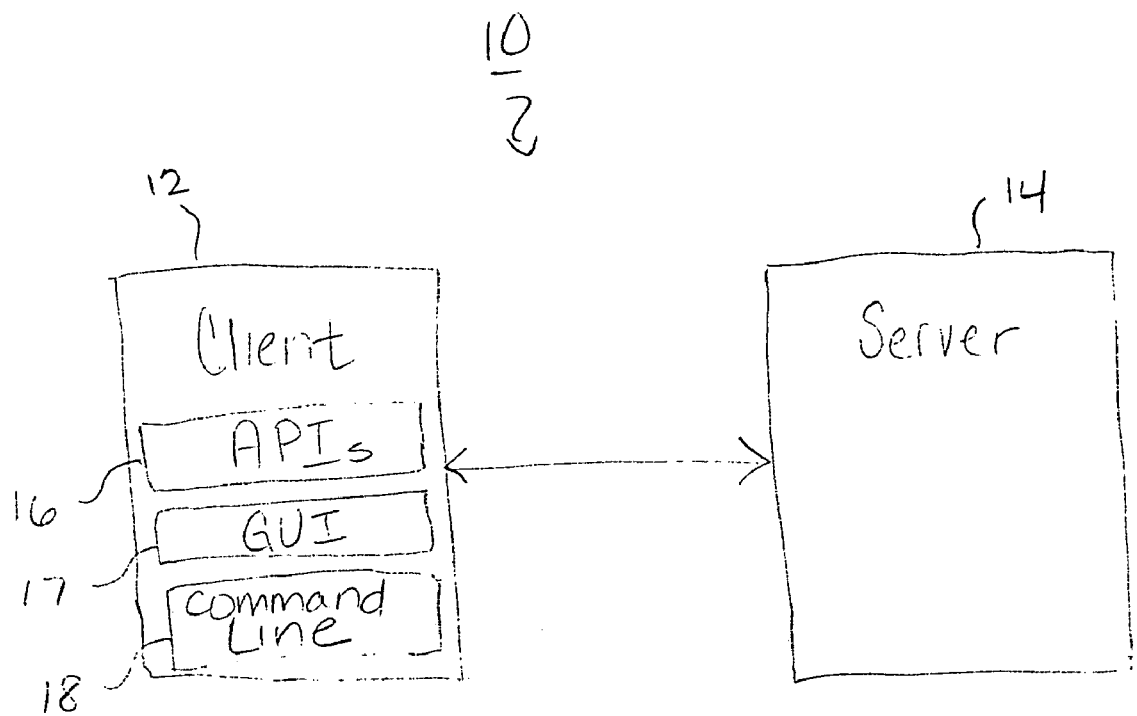
FIG. 1 is a block diagram of a conventional client-server software system.

FIG. 1 illustrates conventional client-server software system 10. The conventional client-server software system 10 includes the conventional client 12 and the conventional server 14. The conventional server 14 typically resides on a server machine using a particular server platform. The conventional client 12 typically resides on a client machine using a particular client platform. The conventional client 12 also may include application program interfaces (APIs) 16, a graphical user interface (GUI) 17, or a command line interface 18, through which the end user accesses the client. The conventional client 12 provides a plurality of functions via communication with the conventional server 14.

Figure 2:
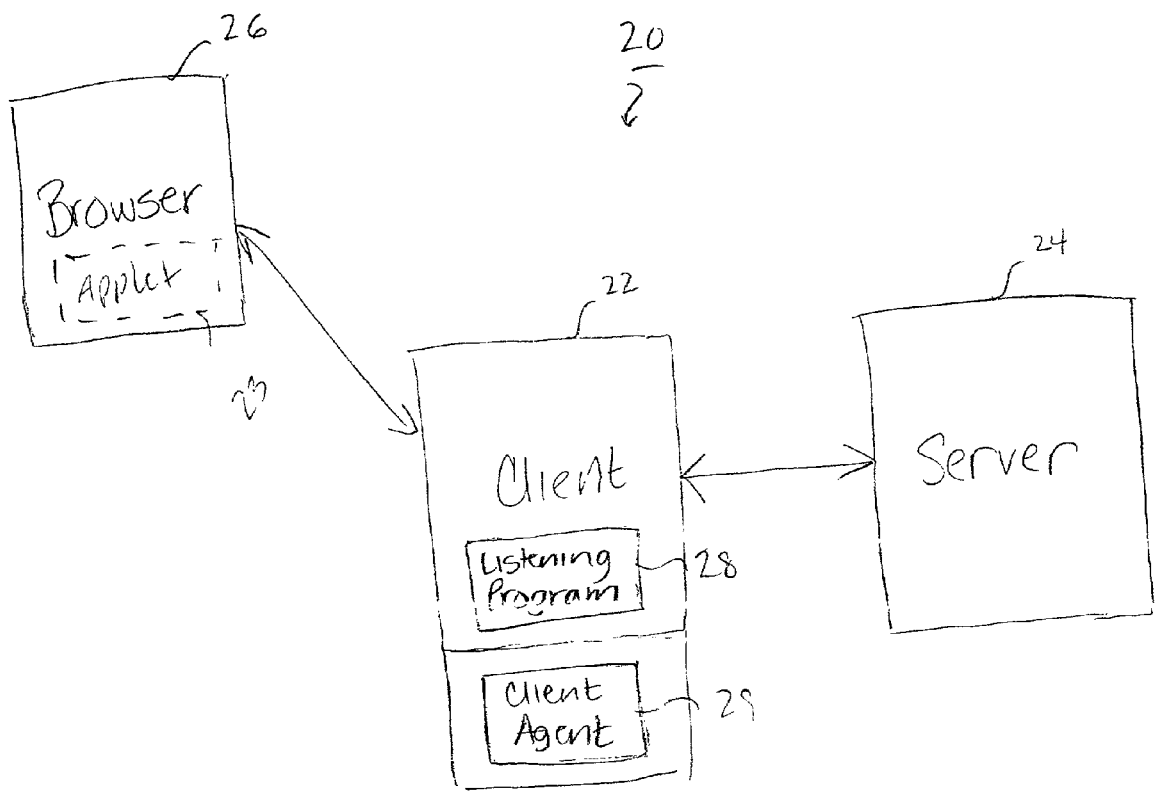
FIG. 2 is a block diagram of the distributed client in a client server system according to the present invention.

FIG. 2 illustrates one embodiment for remotely accessing a client in accordance with the present invention. The remote client access system 20 includes a server 24, a client 22 and a browser 26. The browser 26 is any web browser such as Netscape Navigator or Microsoft Internet Explorer. The browser can be located remotely, can be on the client machine, or can even be on the server machine. The client 22 is similar to the conventional client 12, with improvements that allow for communication with both the browser 26 and the server 24. The client 22 further includes a listening program 28 such as an hyper-text transport protocol (HTTP) daemon facility and a client agent 29, that set up the communication between the client 22 and browser 26, and between the client 22 and server 24.

Figure 3:
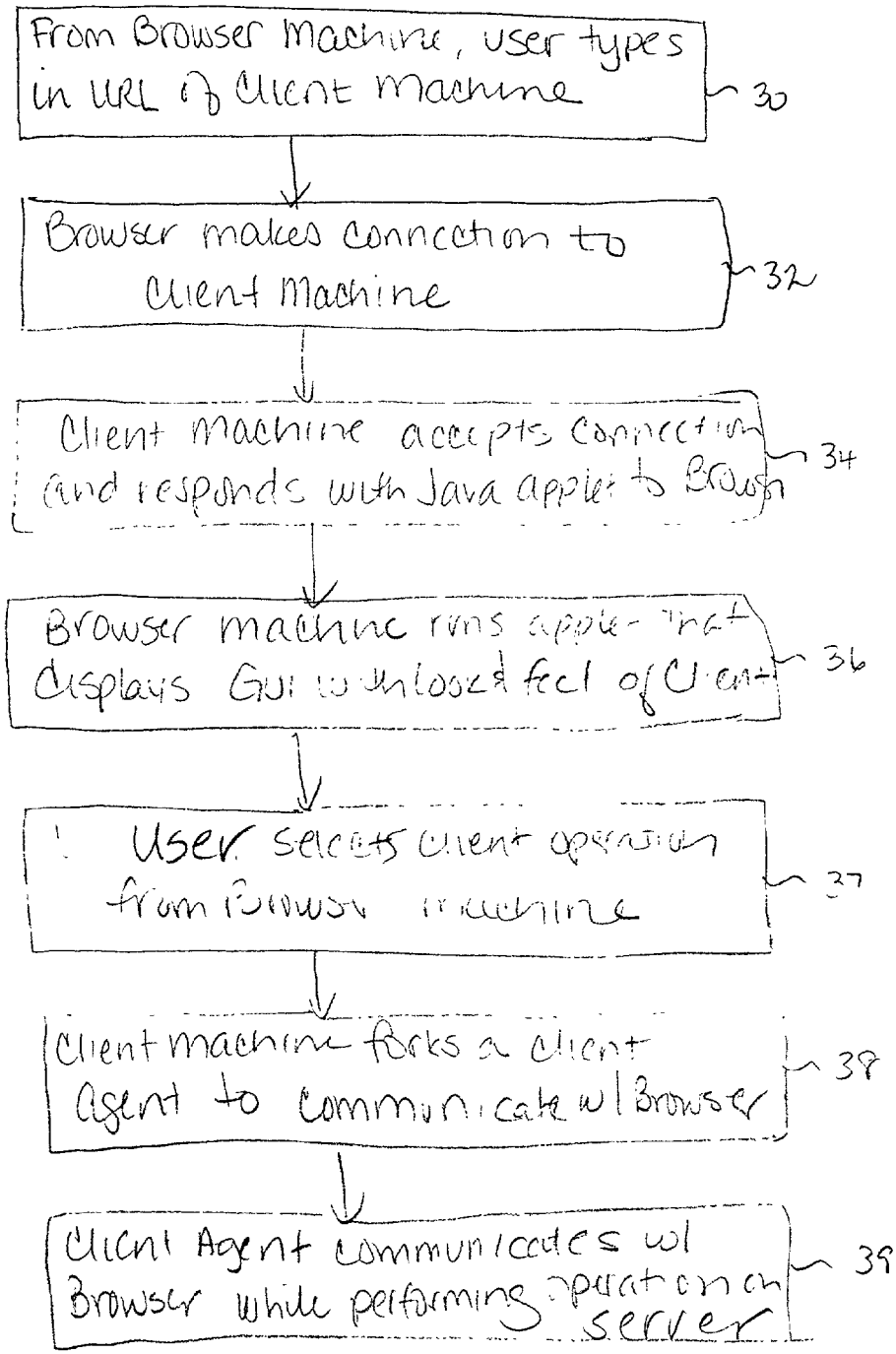
FIG. 3 is a flow chart depicting the access to the client according to the present invention.

The method for remotely accessing the client is described generally in connection with the flow diagram in FIG. 3. First, at step 30, from the browser 26, a user enters information about the client 22 they want to access at the universal resource locator command line (or URL). This request is in the form of the machine name and HTTP port number, separated by a colon. At the client machine 22, the listening program 28 is listening at this defined port, and keeps track of contact made to the client 22. If contact is made (for example, as described in step 30 above), the listening program 28 responds with the port number for establishing the next communication with that client machine 22. Next, at step 32, the browser 26 makes a connection to the client machine 22. In the client machine 22, the listening program 28 accepts the connection from the browser 26, and serves a response such as a JAVA applet back to the browser 26 at step 34. The JAVA applet can run in the national language and locale of the browser. This is accomplished by querying the JAVA virtual machine that is on the browser machine. Alternatively, the applet can run in the national language of the client 22. The response or JAVA applet contains a GUI. The GUI could be a fully functional GUI that has the same look and feel as the client software running on the client machine, or could be as simple as a command line interface. The response also contains command verbs or APIs to allow client operations to take place from the browser 26. These verbs are structured such that communications between the client agent 29 and applet 23 running at the browser 26 are both language independent and machine independent. This is accomplished by tailoring the verbs to the specific application that the client performs without language or machine type dependencies. Next, at step 36, the browser 26 displays the client GUI. At step 37, the user selects a client operation from the GUI displayed. For security purposes, an ID and password can be required. The ID and password may be encrypted at the browser 26 and decrypted at the client agent 29, also for security reasons. The level of access to client operations can be controlled by this ID and password requirement. At step 38, the listening program 28 verifies the ID and password received from the browser, then spawns a client agent 29 to perform the requested operation and communicate with the browser 26. The client agent 29 contains the conventional client bundled within a layer of a communications interface that allows the client machine 22 to be accessed directly or remotely. The communications interface contains a set of verbs or APIs that are understood by both the client 22 and the applet 23 running in the browser 26. At step 39, the client agent 29 communicates back and forth with the applet on the browser 26 in this new protocol (that includes verbs for sending and receiving information needed to display to the user through the GUI). When the client request is completed, the client agent 29 waits for additional requests, if any.

Figure 4:
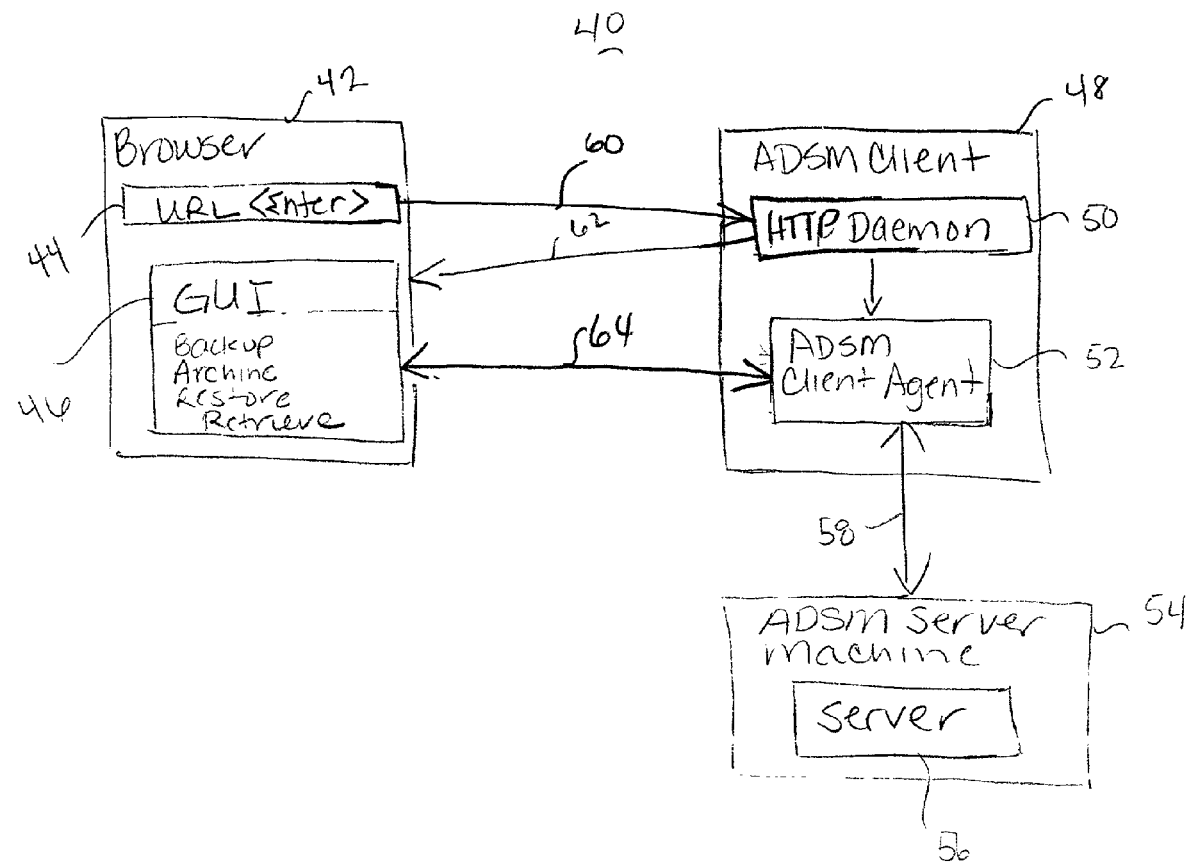
FIG. 4 is a block diagram illustrating the distributed client of the present invention in a distributed storage management software application.

FIG. 4 is a block diagram which shows the system and method for a distributed client in the context of a client-server storage management software product such as Adstar Distributed Software Management product by the IBM Corporation (ADSM). Here, the system 40 incudes a browser 42, a client machine 48, and a server machine 54 which includes an ADSM server 56. Here, the user enters the ADSM client machine name and ADSM client HTTP port number, separated by a colon, at the URL 44 in the browser 42. Over connection 60 which may be a network connection, the browser 42 establishes communication with the distributed storage management client 48. At the distributed storage management client 48, the HTTP daemon (listening program) 50 in the ADSM client 48 accepts the connection, and serves a JAVA applet using connection 62 back to the browser 42. The browser 42 then displays the ADSM client GUI 46. The user, for example, clicks on BACKUP from the GUI, and is prompted for an ID and password. This is communicated back to the ADSM client 48 over connection 64. At the ADSM client 48, the HTTP daemon 50 spawns the ADSM client agent 52. The ADSM client agent 52 then sends and receives all the information required to display the GUI to the end user, as well as communicating over connection 58 with the ADSM server 56 in the server machine 54 to perform the requested backup.

Figure 5A:
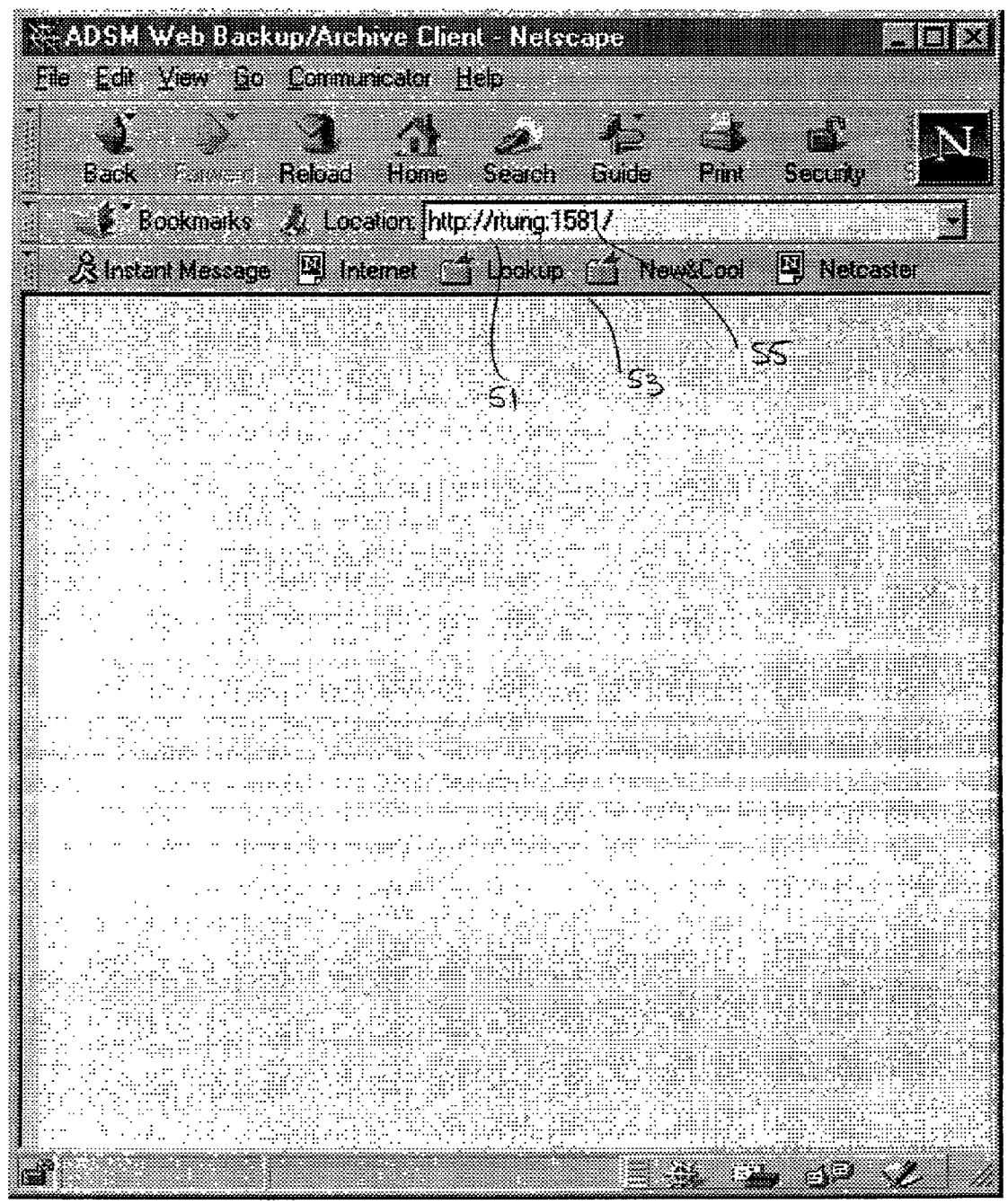
FIGS. 5a–5e illustrate an example of remotely accessing a client to perform client operations shown and described in FIG. 4 according to the present invention.
Figure 5B:
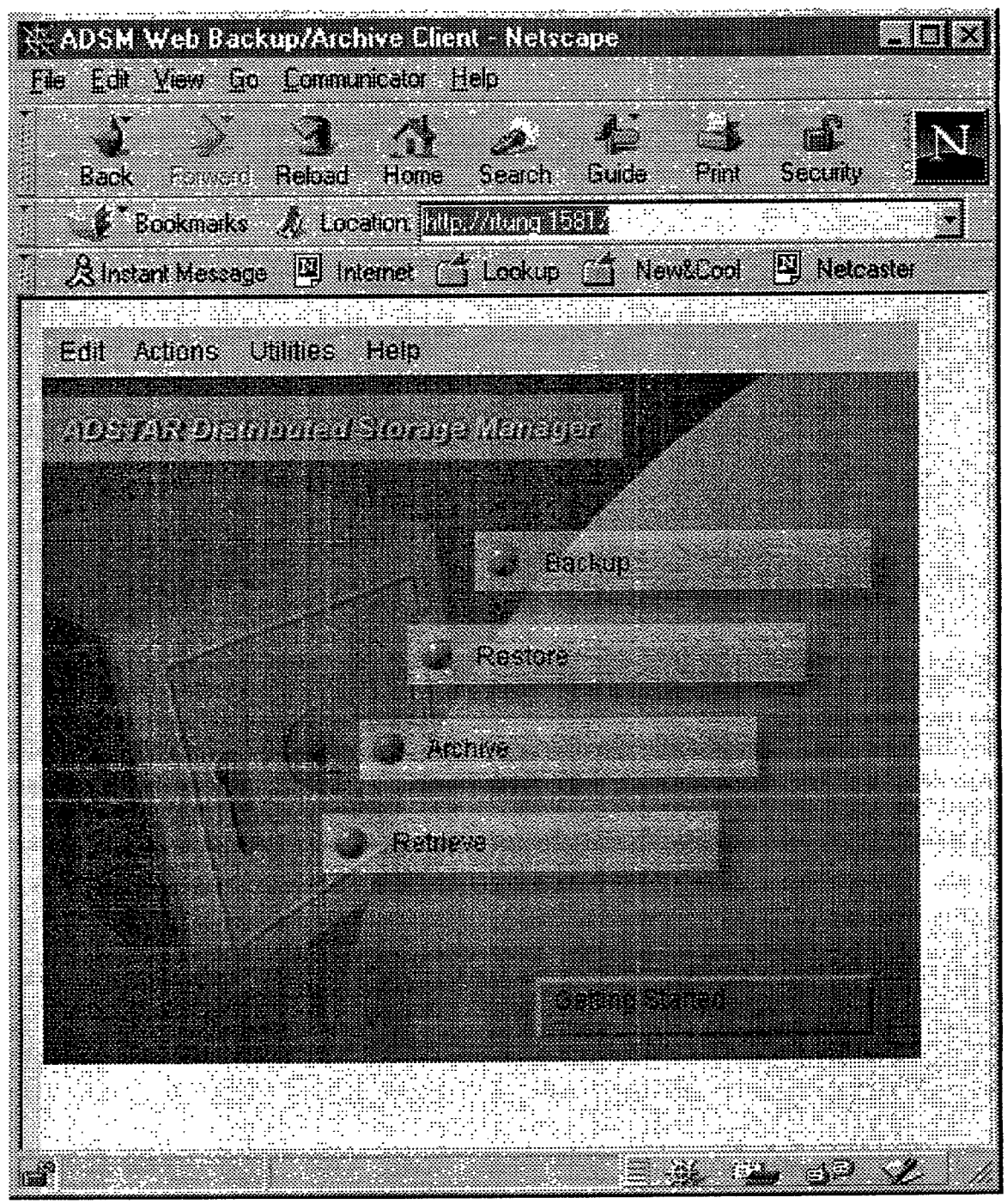
Figure 5C:
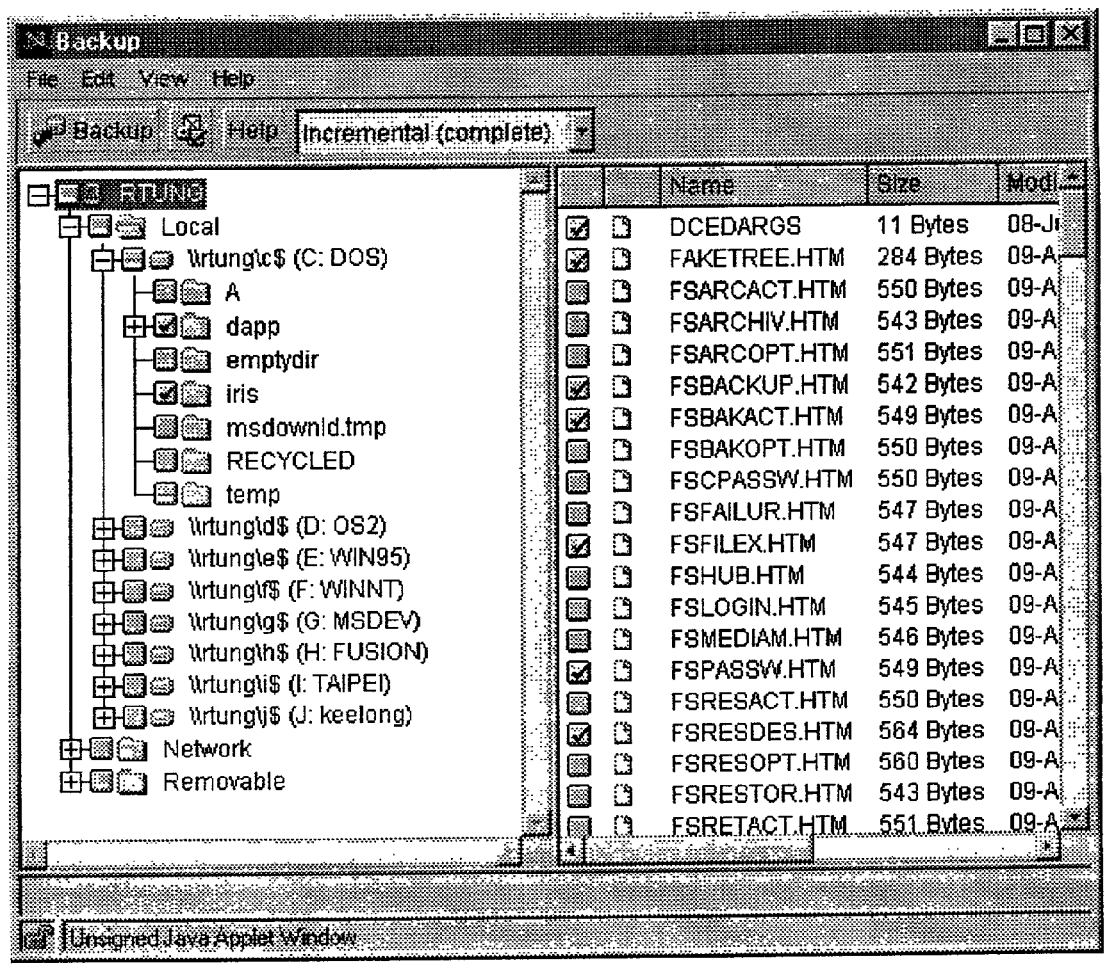
Figure 5D:
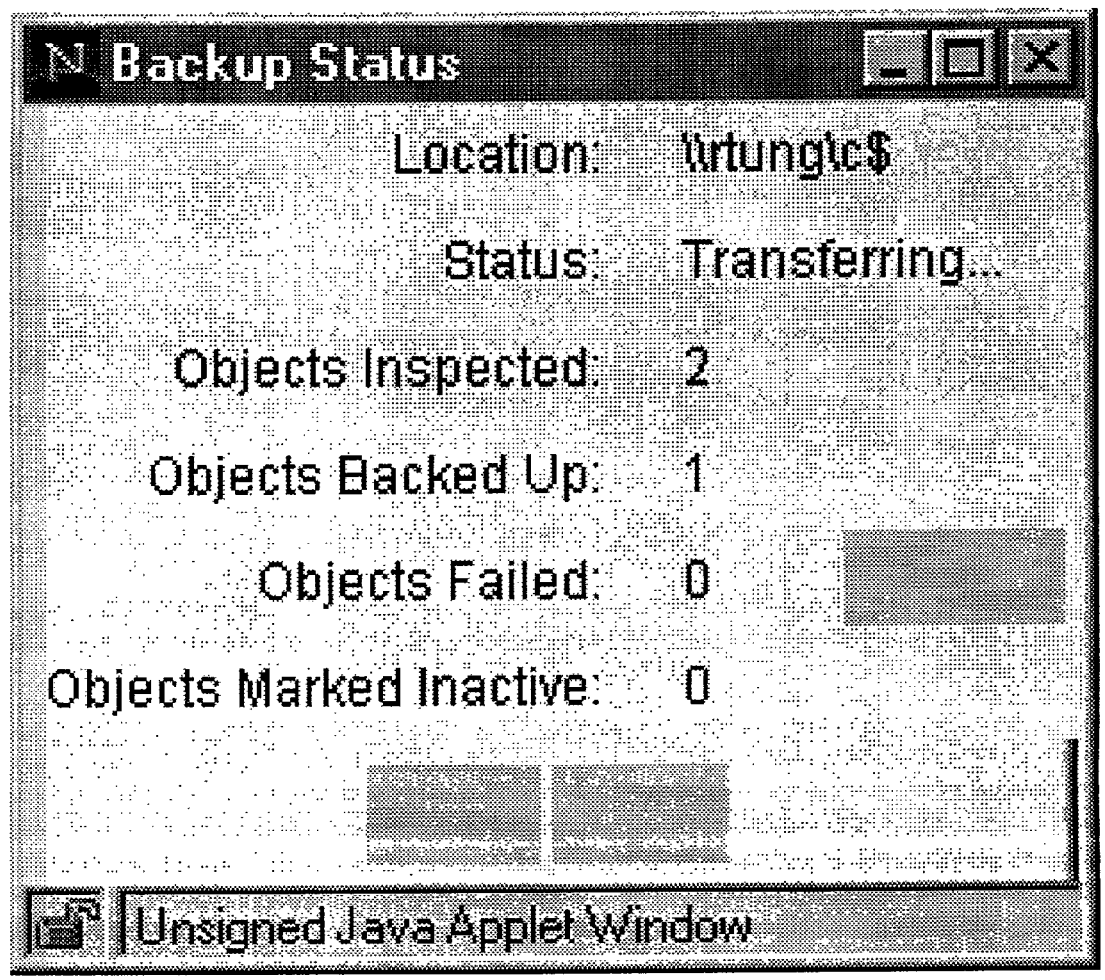
Figure 5E:
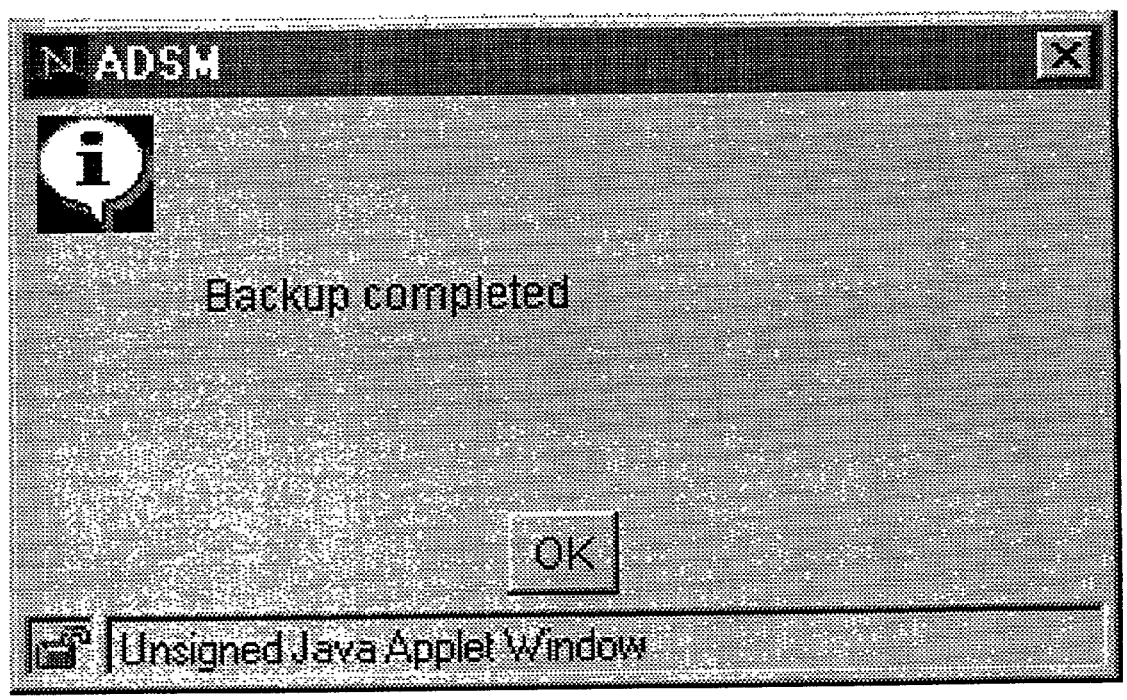

FIGS. 5a–5e are screen captures that illustrate the remotely accessible client described on FIG. 4. FIG. 5a shows a browser such as a Netscape Navigator browser. At the URL 51, the user enters the ADSM machine name 53 and HTTP port number 55 separated by a colon. FIG. 5b shows the display of the GUI at the browser from the applet received from the HTTP daemon on the ADSM client machine. As can be seen in FIG. 5b, the GUI provides the same look and feel as login access directly on the client machine would appear. Here, the user selects an operation to be performed. For example, as described above, the user can select a BACKUP operation. FIG. 5c is a screen display illustrating results of the communication that then takes place between the client agent spawned from the HTTP daemon and the distributed storage management client GUI on the browser. Here, the user's directory is displayed as if the user was actually logged onto the client machine. FIG. 5d illustrates that this is a very interactive process as the client agent is also in communication with the server and performing the requested operation. This is one example of the types of messages displayed at the browser while the client is performing the backup operation to the server. Lastly, FIG. 5e illustrates that the requested operation is completed and the user may now perform another operation on the client.

FIG. 6 shows one example of the structure of the application program interface (API or verb) which is understood by both the browser and the client agent of the present invention. The example of FIG. 6 shows the verb for beginning a transaction once communication is established between the browser and the client agent.

Figure 7:
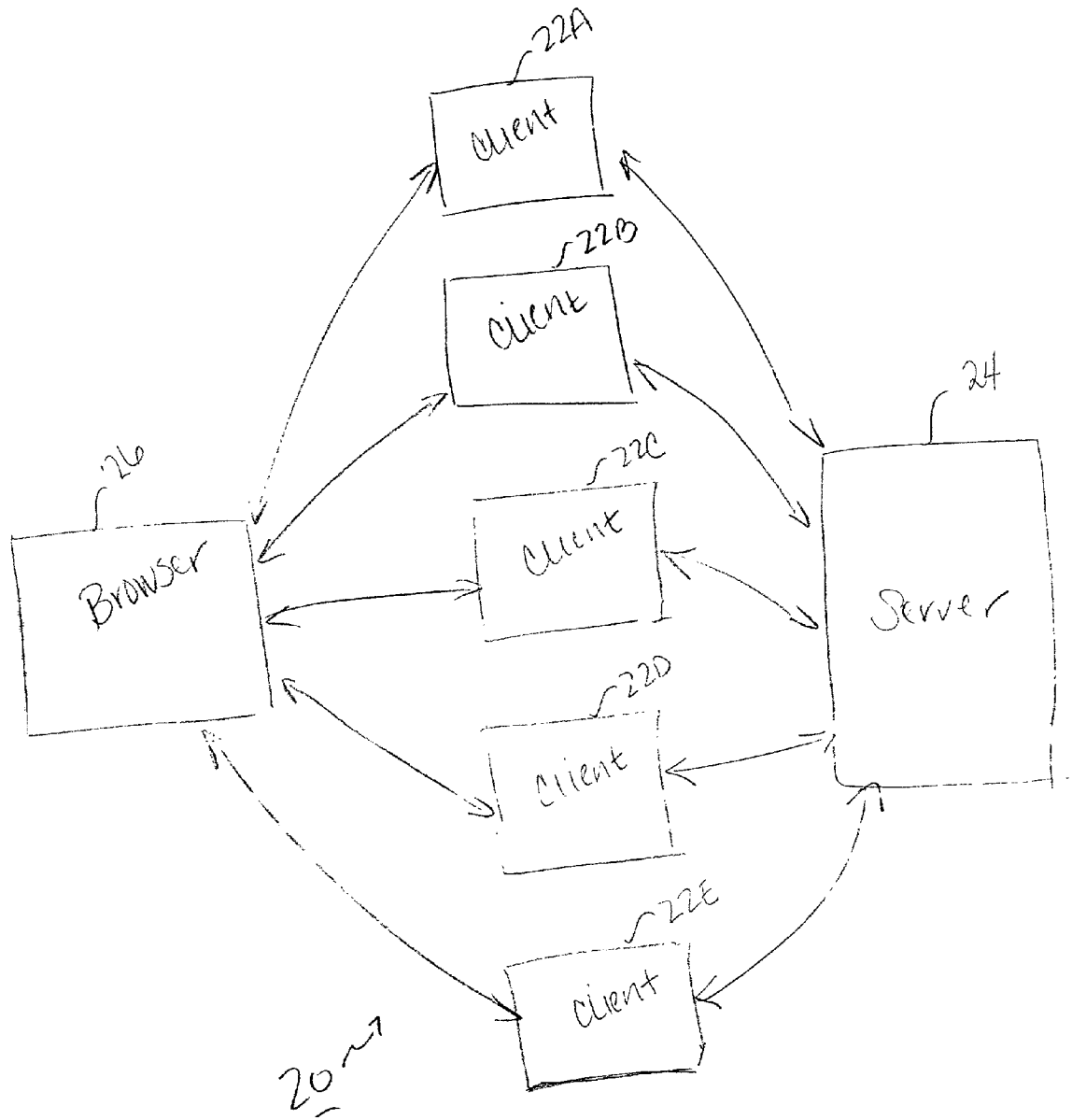
FIG. 7 is a block diagram illustrating the client-server system of FIG. 2 where the browser is shown accessing clients across multiple platforms.
Figure 8:
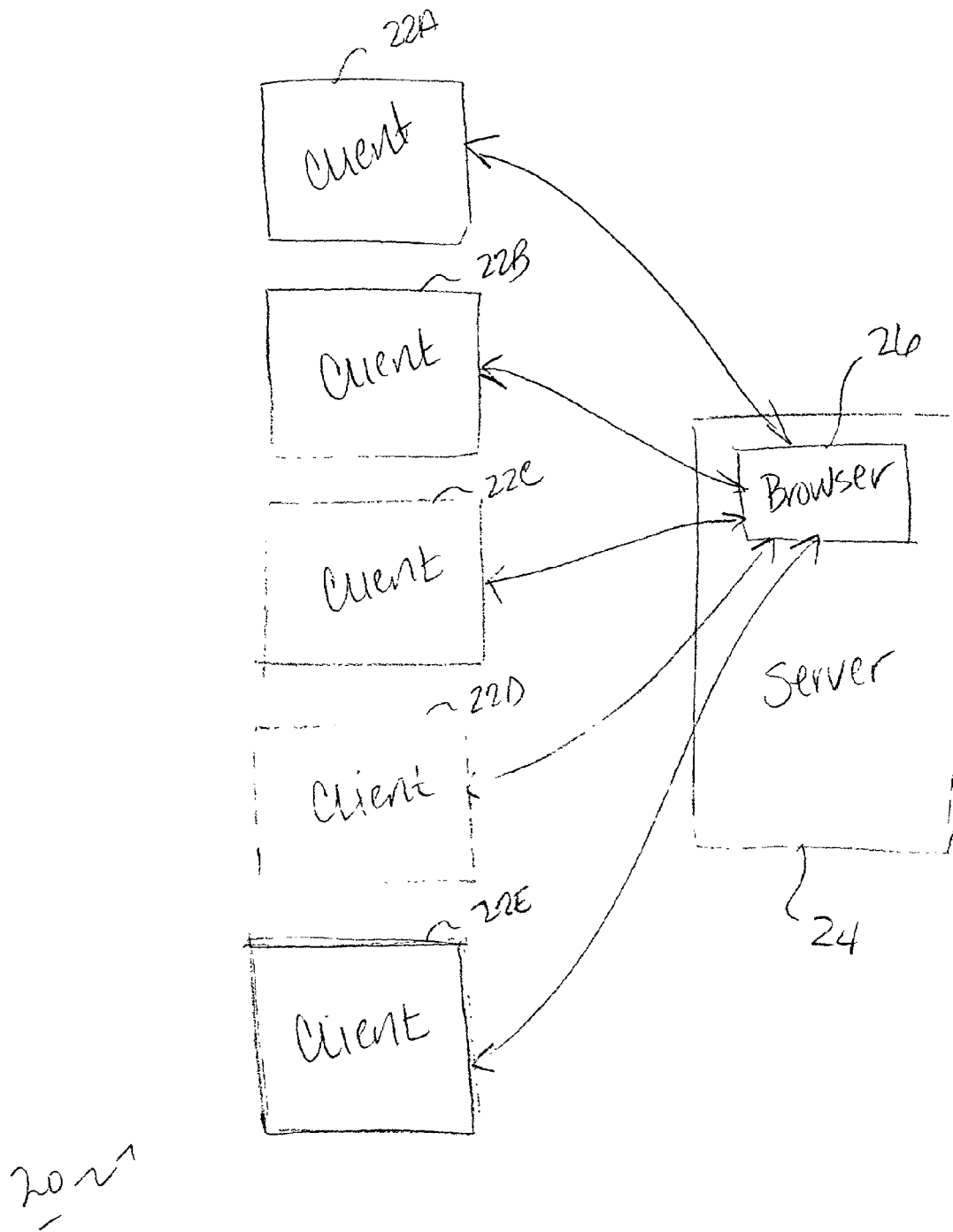
FIG. 8 is a second embodiment of the client-server system shown in FIG. 7 where the browser is on the same machine as the server.

FIG. 7 shows a the remote client access system 20 of FIG. 2, wherein browser 26 showing how from one browser 26 a user can access different clients across different platforms simply by inputting the client machine port number and URL as previously described herein. Here, browser 26 can access any one of the clients 22A, 22B, 22C, 22D, and 22E following the principles of this invention. FIG. 8 shows an alternative embodiment of the remote client access system 20 of FIG. 7, where the browser 26 resides on the server 24.

While the present invention has been particularly shown and described with reference to the preferred embodiments, it will be understood by those skilled in the art that various changes in form and detail may be made without departing from the spirit, scope and teaching of the invention. For example, the present invention has been described in terms of particular platforms and particular functions provided in the client-server environment. However, one of ordinary skill in the art will readily recognize that this method and system will operate effectively for other types of platforms and other functions. In addition, the present invention will be described in terms of a particular number of servers, client platforms, server platforms, client machines and server machines. However, one of ordinary skill in the art will realize that nothing prevents the method and system from use with another number of servers, client platforms, server platforms, client machines and server machines. Accordingly, the disclosed invention is to be considered merely as illustrative and limited in scope only as specified in the appended claims.

What is claimed is:

1. A system for remotely accessing a client in a client-server system comprising:
 a browser for requesting remote access;
 a client machine further comprised of a listening program configured to be responsive to requests for remote access from the browser, establish direct communications therewith, and invoke a client agent for communicating with the browser and a server machine, the client agent configured to control the client machine responsive to browser commands, wherein the browser requests access to a client machine by sending a universal resource locator containing a machine name and a port number of a network, and wherein the listening program is listening on the port number, and establishes communications with the browser over a second port number in response to the request for access.

2. The system for remotely accessing a client in a client server system as claimed in claim 1, wherein the listening program spawns the client agent to communicate with the browser.

3. The system for remotely accessing a client in a client server system as claimed in claim 2, wherein the client agent sends the browser an applet further comprising graphical user interface to execute on the browser.

4. The system for remotely accessing a client in a client server system as claimed in claim 3, wherein the applet executes in the national language and locale of the browser.

5. The system for remotely accessing a client in a client server system as claimed in claim 3, wherein the browser is located on the server machine.

6. The system for remotely accessing a client in a client server system as claimed in claim 3, wherein the graphical user interface is a command line interface.

7. A method for remotely accessing a client machine from a browser over a network comprising the steps of:
   providing a universal resource locator containing a machine name and a port number at a command line at the browser;
   listening at the port number for access requests at the client machine;
   responsive to a request for access from the browser, establishing direct communications therewith;
   invoking a client agent within an application programming interface, the client agent configured to control the client machine responsive to browser commands;
   sending from the client agent to the browser a graphical user interface that looks like a GUI on the client machine when running at the browser; and
   communicating between the client agent and the browser over the network.

8. The method for remotely accessing a client machine from a browser over a network as claimed in claim 7, further comprising the step of:
   communicating between the client agent and a server over the network.

9. The method for remotely accessing a client machine from a browser over a network as claimed in claim 8, wherein the graphical user interface is implemented in a JAVA applet.

10. The method for remotely accessing a client machine from a browser over a network as claimed in claim 8, wherein the communications are comprised of performing client functions from the browser.

11. The method for remotely accessing a client machine from a browser over a network as claimed in claim 10, wherein the communications are further comprised of retrieving files from the server to the client machine.

12. The method for remotely accessing a client machine from a browser over a network as claimed in claim 10, wherein the communications are further comprised of backing up files on client machine to the server.

13. A computer-readable medium tangibly embodying a program of machine-readable instructions, the program containing instructions for:
   providing a universal resource locator containing a machine name and a port number at a command line at the browser;
   listening at the port number for access requests at the client machine;
   responsive to a request for access from the browser, establishing direct communications therewith;
   invoking a client agent within an application programming interface, the client agent configured to control the client machine responsive to browser commands;
   sending from the client agent to the browser a graphical user interface that looks like a GUI on the client machine when running at the browser; and communicating between the client agent and the browser over the network.

* * * * *